Sept. 3, 1946.  A. M. GUREWITSCH  2,407,075
ULTRA HIGH FREQUENCY POWER MEASUREMENT
Filed Nov. 12, 1942
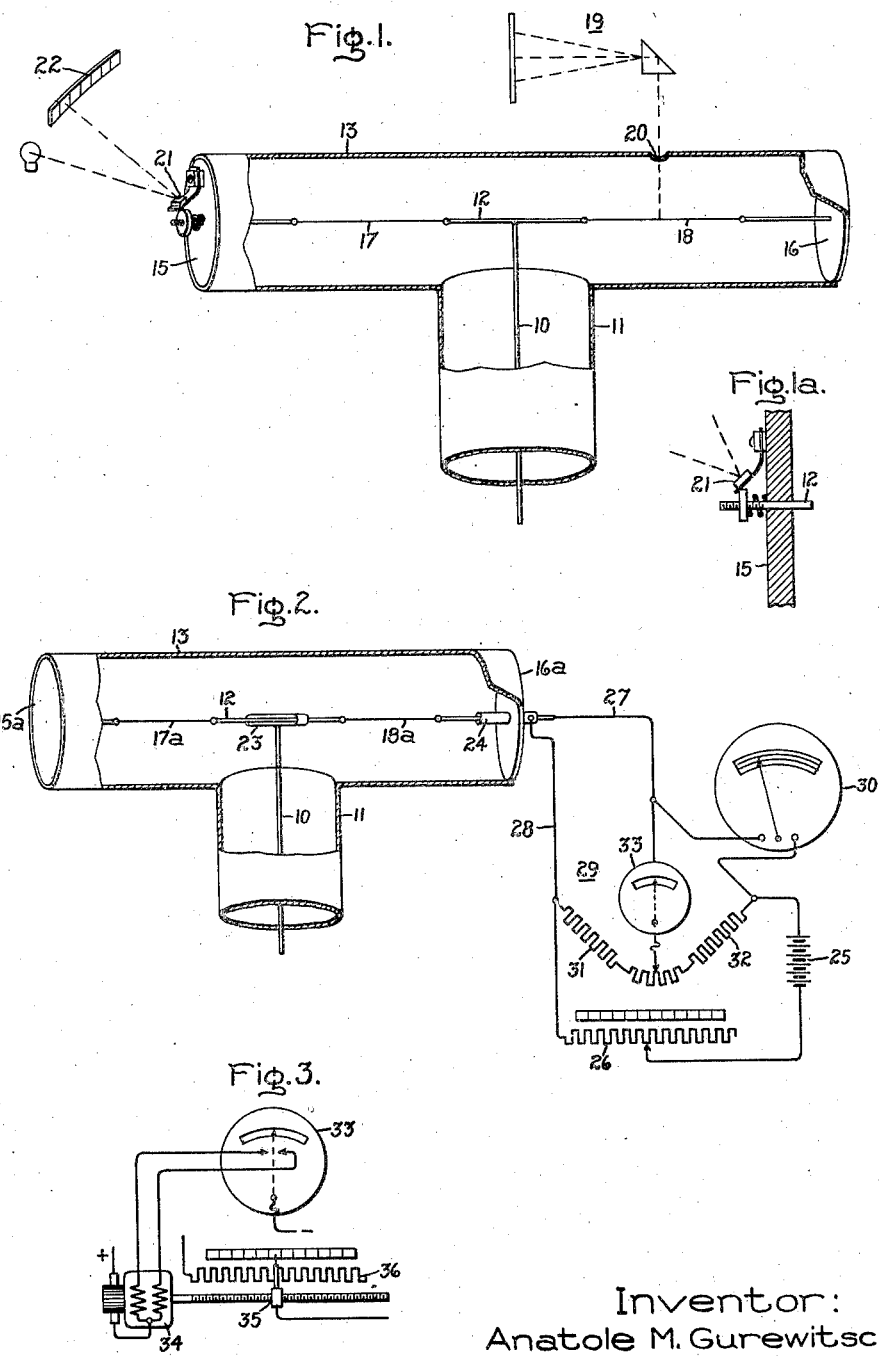
Inventor:
Anatole M. Gurewitsch,
by Harry E. Dunham
His Attorney.

Patented Sept. 3, 1946

2,407,075

UNITED STATES PATENT OFFICE 2,407,075

ULTRA HIGH FREQUENCY POWER MEASUREMENT

Anatole M. Gurewitsch, Schenectady, N. Y., assignor to General Electric Company, a corporation of New York Application November 12, 1942, Serial No. 465,358

6 Claims. (Cl. 171—95)

My invention relates to the measurement of current and power in ultra high frequency circuits. An important object of my invention is to provide a measurement loading device for high frequency circuits which has a constant impedance over a large range of frequency and load and which, therefore, does not change the circuit impedance characteristics of the high frequency circuit with frequency and load variation.

The features of my invention which are believed to be novel and patentable will be pointed out in the claims appended hereto. For a better understanding of my invention reference is made in the following description to the accompanying drawing in which Fig. 1 represents a simplified embodiment of my invention where the high frequency load is measured by observing the color temperature of a resistance element heated by the high frequency current. Fig. 1a represents a modification in which the high frequency load is measured by observing variations in elongation of a resistance element. Fig. 2 represents a preferred embodiment of my invention where the resistance of a temperature sensitive high frequency resistances load is maintained constant by a variable amount of direct current and the direct current circuit is used for high-frequency load measurement purposes, and Fig. 3 illustrates an automatic regulator for maintaining the temperature sensitive resistance load of Fig. 2 constant.

In Fig. 1, 10 and 11 represent the inner and outer conductors of a concentric high frequency supply line and in particular the loaded end of such line, the source of high frequency supply not being shown. 12 and 13 represent the inner and outer conductors of a second concentric line which is used as a load at the end of the supply line. This second line will hereafter be referred to as the load line to distinguish it from the supply line. The load line here represented consists of a hollow metal cylinder closed at its ends with the conductor 12 extending axially between the centers of the end walls 15 and 16. It is noted that the outer conductors 11 and 13 of the two lines are symmetrically connected to preserve the concentric cable arrangement of both lines. The inner conductor 12 of the load line includes two similar resistance sections 17 and 18 of filament cross-section of known resistance and adapted when loaded with high frequency current to be heated to a high temperature so as to flow with a brightness proportional to the heating current. It is further noted that the two halves of the load line including the resistances 17 and 18 are connected in parallel across the supply line. The load line thus terminates the high frequency line and constitutes a load therefor. The concentric cable arrangement renders this load non-inductive so that the load is substantially a resistance load comprising the resistances 17 and 18 in parallel. The impedance characteristics of the load, therefore, do not change with frequency variations. If the resistance elements 17 and 18 be made of a material having a zero temperature coefficient of resistance the resistance impedance of such load will not vary with different values of heating current. Thus, I have provided a load for high frequency circuits which has constant impedance characteristics regardless of frequency and load variations. Such a loading device will be found useful for high frequency testing purposes regardless of any current or load measurements that may be made.

However, the high frequency current may be measured by measuring the temperature of one of the resistance elements 17 or 18 and since the load resistance is constant and known, the measurement can also be used, measuring the power input. Any measurement scheme employed should be one that does not destroy or vary the constant impedance characteristics of the device. In Fig. 1 I have diagrammatically indicated at 19 a color temperature meter which looks through an opening 20 at one of the hot resistance elements and by means of which the temperature of the resistance may be ascertained over a limited glow temperature range. As an alternative arrangement I may produce a slight tension on resistance element 17 by means of a spring connection between the end wall 15 and the center conductor rod section 12, as indicated in Fig. 1a, and cause the variation in elongation of resistance element 17, which varies with temperature, to rotate a small mirror 21 and cause this mirror to move a light beam over a suitable scale 22. Such arrangements will not disturb the constant impedance characteristics of the load. Owing to the fact that the load is a resistance, it and the measurement schemes may be calibrated by easily measured and controlled direct current as by connecting the direct current calibrating circuit to the load in place of the high frequency supply line.

The preferred measurement scheme is shown in Fig. 2. Here parts similar to those of Fig. 1 are designated by corresponding reference numerals and corresponding parts which have been modified slightly are designated by corresponding reference characters followed by the letter *a*. In Fig. 2 the high frequency circuit connection between the conductors 10 and 12 is by means of a by-pass condenser 23 and the high frequency circuit connection between the center conductor 12 of the load line and at least one end wall 16a is also by means of a by-pass condenser 24. The purpose of this is so that I can pass direct current through the conductor 12 and its resistance elements 17a and 18a, and segregate the direct current circuit from the high frequency supply line without interfering with the flow of high frequency current through the load line. The by-pass condensers shown are small tubular conductors surrounding and spaced from the conductor 12. Their impedance to the flow of high frequency currents is insignificant as compared to the load impedance and may be disregarded. The direct current circuit connections to the high frequency circuit are thus made across points which have a negligible A.-C. voltage and no high frequency current tends to flow into the D.-C. bridge circuit.

Also in Fig. 2, the resistance elements 17a and 18a have a temperature coefficient of resistance but it is immaterial whether this be a positive or a negative coefficient so long as it is sufficient for my purposes and the resistance elements are alike. It will be assumed in the discussion to follow that these resistances have positive temperature coefficients of resistance.

In Fig. 2 I maintain the elements 17a and 18a at a constant temperature and resistance by passing direct current therethrough. A variable part of the heating of these resistances is caused by the flow of high frequency current therethrough in parallel from the high frequency supply circuit. The remainder of the heating necessary to maintain these resistance elements at a constant temperature and resistance is produced by passing direct current therethrough in series. The direct current is supplied from a source 25 through a variable resistance 26. The direct current circuit enters one end of conductor 12 by way of wire 27 and passes out the other end to end wall 15a.

The shell 13 is utilized for the direct current return path and a return wire 28 is connected therewith through the end plate 16a and outer shell of by-pass condenser cylinder 24. In order to obtain a constant measurement of the resistance of elements 17a and 18a a resistance measuring Wheatstone bridge 29 is provided as a part of this direct current circuit. The resistances 17a and 18a constitute the resistance in one arm of the bridge. A resistance preferably in the form of a direct current measuring instrument 30 constitutes another arm of the bridge. The remaining arms are composed of ordinary resistances 31 and 32, as indicated. A sensitive galvanometer 33 is connected across the bridge to show when it is in balance or the direction and extent of unbalance. As connected, the direct current supplied from source 25 divides, part going through arms 31 and 32 and the remainder through the resistance elements 17a and 18a and instrument 30. The arms 30, 31 and 32 of the bridge have such temperature coefficient of resistance relations that changes in the volume of current through the bridge does not change the current distribution and condition of balance assuming arm having resistances 17a and 18a remains at the selected constant value.

In calibrating the apparatus of Fig. 2 an operating temperature and resistance of elements 17a and 18a is first selected such that the maximum high frequency current to be measured if acting alone will not heat resistances 17a and 18a in excess of such selected temperature and preferably such selected temperature will in addition require a measurable quantity of direct current near the low current range of adjustment of resistance 25. Also, the direct current variation range of the apparatus should be such that the selected operating temperature of resistances 17a and 18a can be obtained when the A.-C. current to be measured is zero.

Having selected the operating temperature and resistance of elements 17a and 18a the bridge is balanced when the bridge arm 17a, 18a is at the selected resistance. For example, each element 17a and 18a may have 100 ohms resistance for the selected value so that the bridge should be balanced when the arm containing resistances 17a and 18a is 200 ohms, and this should hold true for any value of direct current within the measurement range of the apparatus. It will be noted that when the bridge is balanced no current flows through galvanometer 33 and hence the direct current which flows through resistance elements 17a and 18a will also flow through instrument 30 and can be measured thereby. Instrument 30 should be one suitable for measuring the range of direct current which will be used to heat resistance elements 17a and 18a. The instrument 30 should read near the upper end of its scale when the bridge is balanced with no high frequency current flowing. Let us assume this value of direct current is one-half ampere. It is the value of current required to heat the resistances 17a and 18a to a temperature where their resistances will be 100 ohms each. This heating current is a constant but variable portions thereof are supplied by the high frequency and direct current circuits but one-half ampere of high frequency current in resistances 17a and 18a corresponds to one ampere in the high frequency supply line because resistances 17a and 18a are in parallel in the high frequency circuit.

Since the A.-C. load impedance is resistance and is held constant, the A.-C. load is readily determined. Since the A.-C. load resistances are connected in parallel and the D.-C. load resistances are connected in series, the A.-C. load resistance is one-fourth the D.-C. load resistance, or in the example given 50 ohms and the A.-C. load is $50\,I^2$, where I is the A.-C. current in the high frequency supply line.

Relative values of direct current through 17a, 18a and meter 30, the alternating current in the high frequency supply line for balanced conditions, and the A.-C. load are:

| D. C. | A. C. | A.-C. load in watts |
|---|---|---|
| 1 | 0 | 0 |
| ¾ | ½ | 12½ |
| ½ | 1 | 50 |
| ¼ | 1½ | 112.5 |
| 0 | 2 | 200 |

The instrument 30 may thus have three scales, an ordinary D.-C. scale reading upward, an A.-C. scale of twice the value of the D.-C. scale but reading downward, and an A.-C. watt scale also reading downward. However, the instrument 30 reads correctly only when the bridge is balanced and before a reading is taken, adjustment of resistance 26 may be necessary.

It is thus seen that I have provided a loading device for ultra high frequency circuits and devices giving constant A.-C. impedance characteristics with changes in frequency and load, also, such a loading device with which the A.-C. current and load may be readily measured without changing its impedance characteristics. The measurement is made with easily controlled and easily measured low voltage direct current and the device is readily calibrated using direct current.

If the D.-C. source 25 is a constant voltage source, the instrument 30 may be replaced by an equivalent resistance and the measurement scales may be placed along the resistance 26. In some cases the instrument 33 may be calibrated and measurements made by bridge unbalance.

In any case, where it becomes desirable to maintain the load resistance constant automatically, the galvanometer may be provided with contacts as shown in Fig. 3 to control a reversible pilot motor 34 for moving the adjusting element 35 of the variable resistance 26. Other resistance measuring and control schemes may be used without departing from the invention. It is, of course, possible to vary the load within limits by selecting different operating temperatures and resistance values for the resistance elements 17a and 18a. This will require a rebalancing adjustment of the bridge.

What I claim as new and desire to secure by Letters Patent of the United States is:

1. In combination with a concentric cable high frequency supply line, a concentric cable load line therefor, the inner cable of which includes two similar resistance sections in series relation, connections between the inner and outer cables of the load line at its two ends, a connection between the outer conductors of the supply and load lines, a connection between the inner cable of the supply line and the inner cable of the load line between the resistance sections thereof whereby said resistance sections are connected in parallel across the supply line, all of said connections being suitable for passing high frequency current and of insignificant high frequency impedance as compared to the impedance of said resistance sections whereby the impedance characteristic of said load line is independent of frequency variations, means sensitive to the temperature of said resistances for obtaining a measurement in terms of the high frequency current in the supply line and provisions for assuring that said resistances will have a selected constant value of resistance when a measurement is taken.

2. In combination with a concentric cable high frequency line, load and load measuring apparatus for and terminating said high frequency line comprising a concentric cable load line with its inner conductor including a pair of series connected resistance elements, the inner cable of the load line being directly connected to its outer cable at one end and capacitively connected to its outer cable at the other end, the outer cables of the two concentric lines being connected together and the inner cables of the two concentric lines being connected by a capacitive coupling at a point between the resistance elements of the inner cable of the load line whereby said resistances are effectively connected in parallel across the high frequency line by substantially a non-inductive connecting arrangement.

3. In combination with an ultra high frequency supply line, a non-inductive resistance load comprising two similar resistances non-inductively connected in parallel across said supply line, and a direct current measurement circuit segregated from the high frequency line by capacitance coupling but connected in series relation with said resistances, the direct current circuit connections to said resistances being at points in the high frequency circuit across which the high frequency potential is negligible.

4. A load circuit for an ultra high frequency line which has constant high frequency impedance characteristics comprising similar temperature sensitive resistance elements adapted to be connected in parallel across the high frequency line, means for maintaining said resistances at a constant selected temperature and resistance value with variations in the A.-C. supplied thereto comprising a direct current source connected in series with said resistances, by-pass condensers segregating said direct current circuit from the A.-C. line, and means for controlling the direct current supplied to said resistance so that the heating of said resistances by the direct and alternating currents will maintain said resistances at the selected value.

5. Load and load measuring apparatus for ultra high frequency lines, comprising a pair of similar temperature sensitive resistances adapted to be connected in parallel across the high frequency line, a direct current source of supply connected in series with said resistances, by-pass condensers segregating said direct current circuit from the high frequency line, means for controlling the amount of direct current supplied to said resistances such that their resistance values may be maintained at a selected value with variations in the high frequency current supplied thereto, means for indicating variations in said resistances from the selected value, and means responsive to the control of the direct current for indicating the high frequency current supplied to said resistances when said resistances are at the selected value.

6. Load and load measuring apparatus for ultra high frequency lines comprising a pair of similar temperature sensitive resistances adapted to be connected in parallel across the high frequency line, a Wheatstone bridge measuring circuit, one arm of which includes said pair of resistances in series, by-pass condensers segregating said bridge measuring circuit from the high frequency line such that direct current flowing in the bridge circuit cannot flow into the high frequency line, a direct current source of supply for said bridge circuit, means for varying the amount of direct current supplied to said bridge circuit and an indicating instrument connected across the bridge circuit for indicating the condition of balance thereof, said bridge circuit being calibrated to determine the amount of high frequency current flowing through said resistances from said high frequency line.

ANATOLE M. GUREWITSCH.